(12) United States Patent
Elliot et al.

(10) Patent No.: US 8,646,722 B2
(45) Date of Patent: Feb. 11, 2014

(54) AIRCRAFT TAXIING ACTUATOR

(75) Inventors: Nicholas Elliot, Winscombe (GB);
Arnaud Didey, Portsmouth (GB)

(73) Assignee: Airbus Operations Limited, Bristol (GB)

(*) Notice: Subject to any disclaimer, the term of this patent is extended or adjusted under 35 U.S.C. 154(b) by 116 days.

(21) Appl. No.: 13/012,101

(22) Filed: Jan. 24, 2011

(65) Prior Publication Data

US 2011/0180659 A1 Jul. 28, 2011

(30) Foreign Application Priority Data

Jan. 26, 2010 (GB) .................................. 1001177.3

(51) Int. Cl.
*B64C 25/50* (2006.01)

(52) U.S. Cl.
USPC .......................................................... 244/50

(58) Field of Classification Search
USPC ......... 152/413; 244/50, 100 R, 102 R, 103 R, 244/103 S
See application file for complete search history.

(56) References Cited

U.S. PATENT DOCUMENTS

| | | | | |
|---|---|---|---|---|
| 2,099,489 A | * | 11/1937 | Lambert | 188/72.6 |
| 2,460,387 A | * | 2/1949 | Hunter | 244/50 |
| 3,365,974 A | | 1/1968 | Lieberman | |
| 3,865,170 A | * | 2/1975 | Mitchell | 152/386 |
| 4,986,493 A | * | 1/1991 | Sarh | 244/2 |
| 2006/0156845 A1 | | 7/2006 | Tong | |

FOREIGN PATENT DOCUMENTS

| | | |
|---|---|---|
| GB | 2311264 | 9/1997 |
| WO | 2009125213 | 10/2009 |

OTHER PUBLICATIONS

UK Search Report for GB1001177.3 mailed May 18, 2010.

* cited by examiner

*Primary Examiner* — Timothy D Collins
*Assistant Examiner* — Brian M O'Hara
(74) *Attorney, Agent, or Firm* — Lowe Hauptman & Ham, LLP

(57) ABSTRACT

An aircraft wheel assembly comprising a wheel and an aircraft taxiing actuator comprising, a first shaft for connection to a drive source, the first shaft defining a first axis and a second shaft for connection to the wheel to rotate the wheel, the second shaft defining a second axis substantially perpendicular to the first axis, in which the first shaft and second shaft are connected in driving engagement by a ball-worm gear.

15 Claims, 5 Drawing Sheets

AIRCRAFT TAXIING ACTUATOR

RELATED APPLICATIONS

The present application is based on, and claims priority from, Great Britain Application Number 1001177.3, filed Jan. 26, 2010, the disclosure of which is hereby incorporated by reference herein in its entirety.

The present invention relates to an aircraft taxiing actuator. In particular, the present invention relates to an aircraft taxiing actuator comprising a ball-worm drive.

Aircraft need to be propelled whilst on the ground to enable them to move to and from the runway and passenger terminals. Such taxiing is undertaken either by towing the aircraft or by use of the aircraft's engines to provide a relatively small propulsive force (compared to flight).

Tow taxiing is problematic as towing vehicles have to be available and coupled to the aircraft. Main engine taxiing is problematic because fuel is wasted having such large engines run at such low speeds. Also, gas turbines are noisy and potentially dangerous when run on the ground.

It is an aim of the present invention to provide an improved aircraft taxiing actuator.

According to a first aspect of the invention there is provided an aircraft taxiing actuator comprising, a first shaft for connection to a drive source, the first shaft defining a first axis, and, a second shaft for connection to a landing gear wheel of an aircraft to rotate the landing gear wheel, the second shaft defining a second axis transverse to the first axis, in which the first shaft and second shaft are connected in driving engagement by a ball-worm gear.

The ball-worm provides a reliable and compact method of driving the wheel for taxiing. Furthermore the system can be back driven during take off and landing should either of the other taxiing methods be preferred.

An example aircraft taxiing actuator in accordance with the present invention will now be described with reference to the accompanying drawings in which:

FIG. 1b is a part of the ball-worm assembly of FIG. 1a,

FIG. 1c is a further part of the ball-worm assembly of FIG. 1a,

Figure 1A:
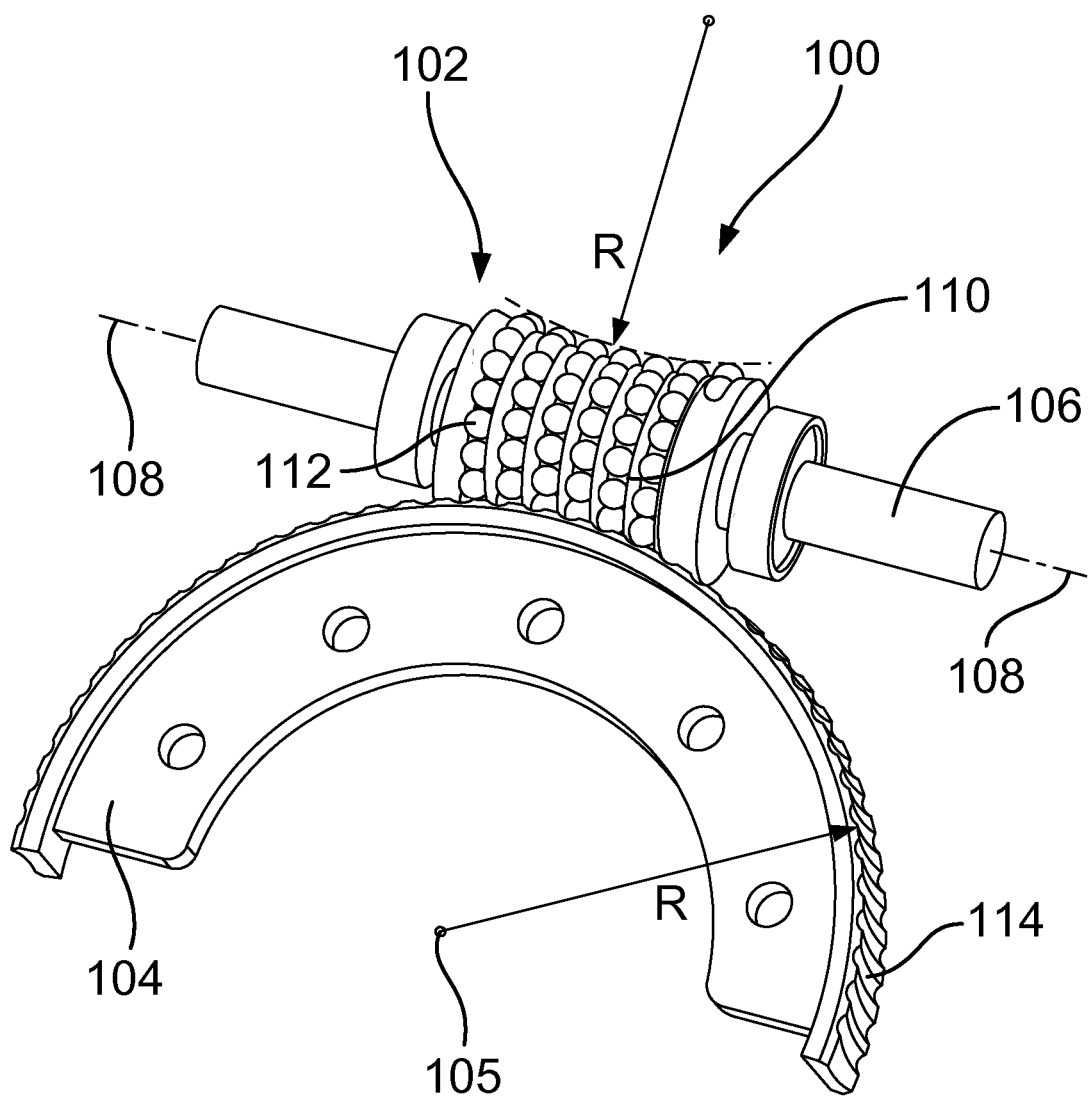
FIG. 1a is a perspective view of a ball-worm assembly.
Figure 1B:
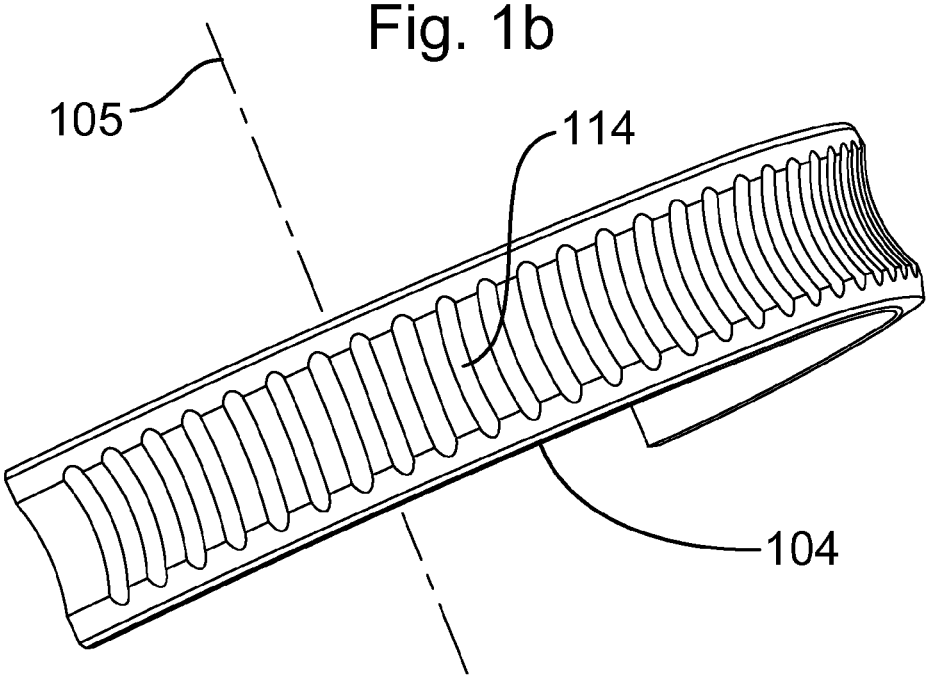
Figure 1C:
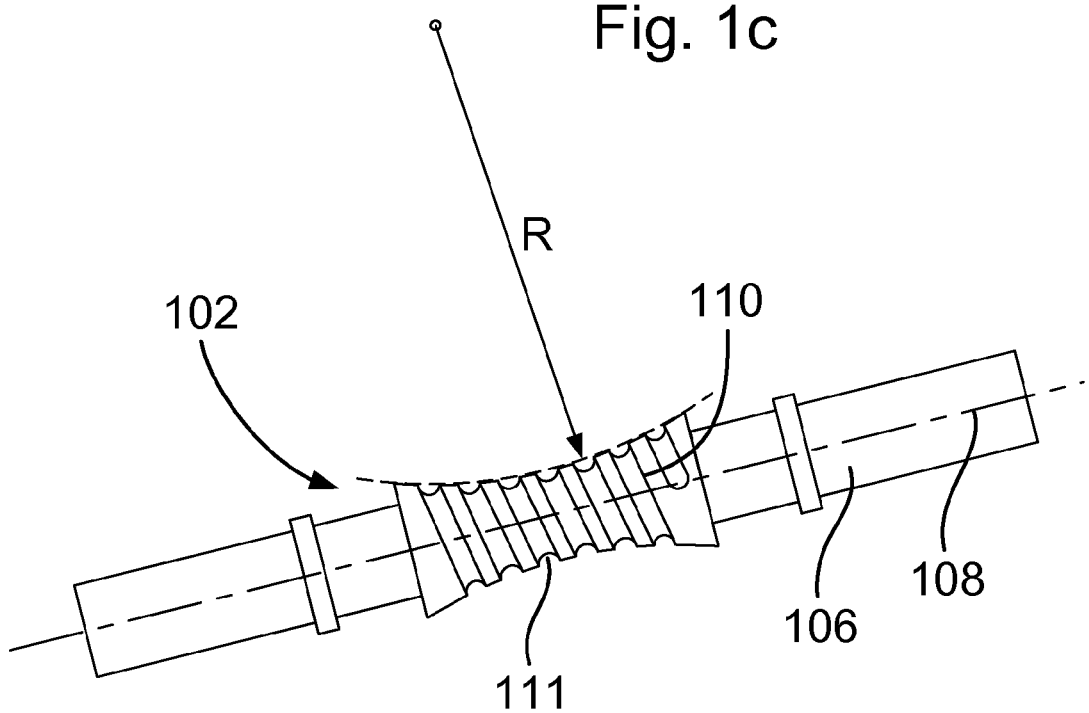
Figure 2:
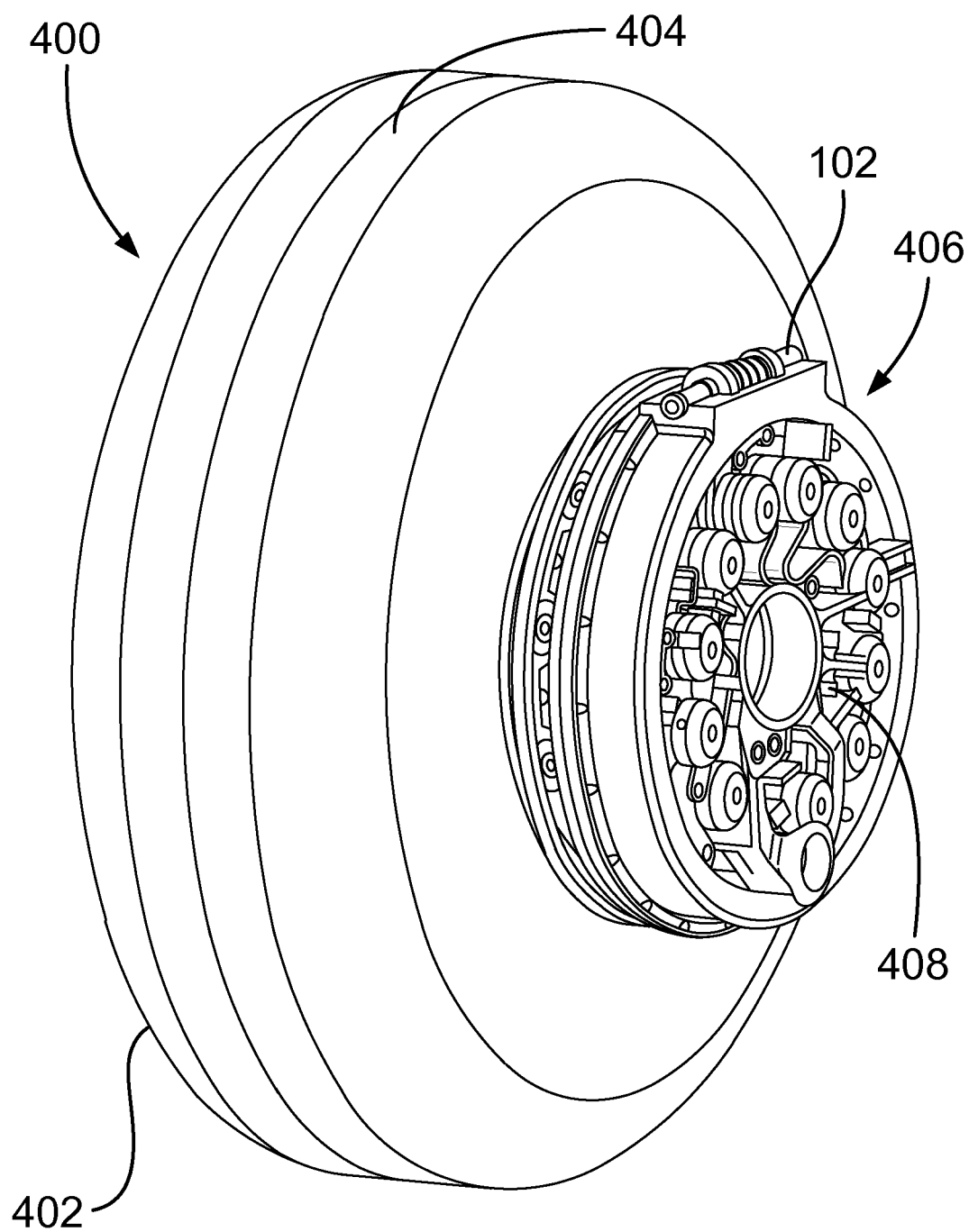
FIG. 2 is a perspective view of an aircraft wheel, tyre and taxiing assembly in accordance with the present invention.

A ball-worm assembly 100 used in the present invention is shown in FIG. 1. The assembly comprises a driving shaft assembly 102 and a driven shaft 104. The driving shaft assembly 102 (also shown in FIG. 1c) comprises a driving shaft 106 defining a driving axis 108. A ball race 110 is attached to the driving shaft 106. The ball race is generally rotationally symmetric and defines a concave outer profile with radius R. A helical ball channel 111 surrounds the ball race 110 about the driving axis 108. A plurality of bearing balls 112 sit within the channel and are encased by a housing (not shown) so that they can move only along the path defined by the channel. The housing includes a recirculation system to provide the balls 112 with the ability to move along the channel in use.

The driven shaft 104 has an outer radius R and defines a driven axis 105. The driven shaft 104 defines a series of axial ball tracks 114 on its outer surface. When the race 110 and the driven shaft 114 are placed in close proximity, the channel and the tracks 114 define a path for the balls 112.

When the driving shaft is rotated, a circumferential force about driven axis 105 is applied to the axial ball tracks 114 of the driven shaft 104 by the balls 112 because they move in a helical path around the ball race 110. Torque is therefore transmitted through the race 110 to the balls 112 and consequently to the driven shaft 104. The ball-worm gear 100 provides a gear reduction from the driving shaft 106 to the driven shaft 104 and transfers the drive through 90 degrees from the axis 108 to the axis 105. Therefore a high speed, low torque input from the driving shaft 106 is geared to a low speed, high torque output at the driven shaft 104.

The ball-worm gear has the advantage that it is low friction compared to traditional worm gears (due to the moving ball bearings 112), and can be back driven, unlike other gear arrangements. Therefore the driven shaft 104 can act to drive the driving shaft 106.

Turning to FIGS. 2 to 5, an aircraft landing gear wheel assembly 400 comprises a wheel 402, a tyre 404 and a taxiing assembly 406. A braking assembly 408 is also provided which will not be described in detail.

Figure 4:
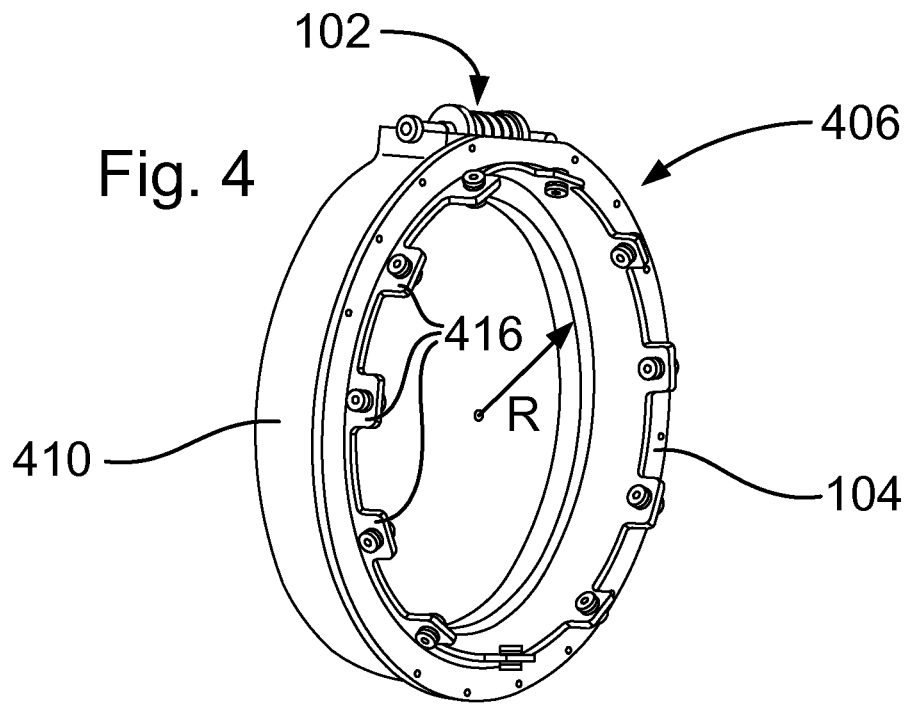
FIG. 4 is a perspective view of the taxiing assembly of FIG. 2.
Figure 5:
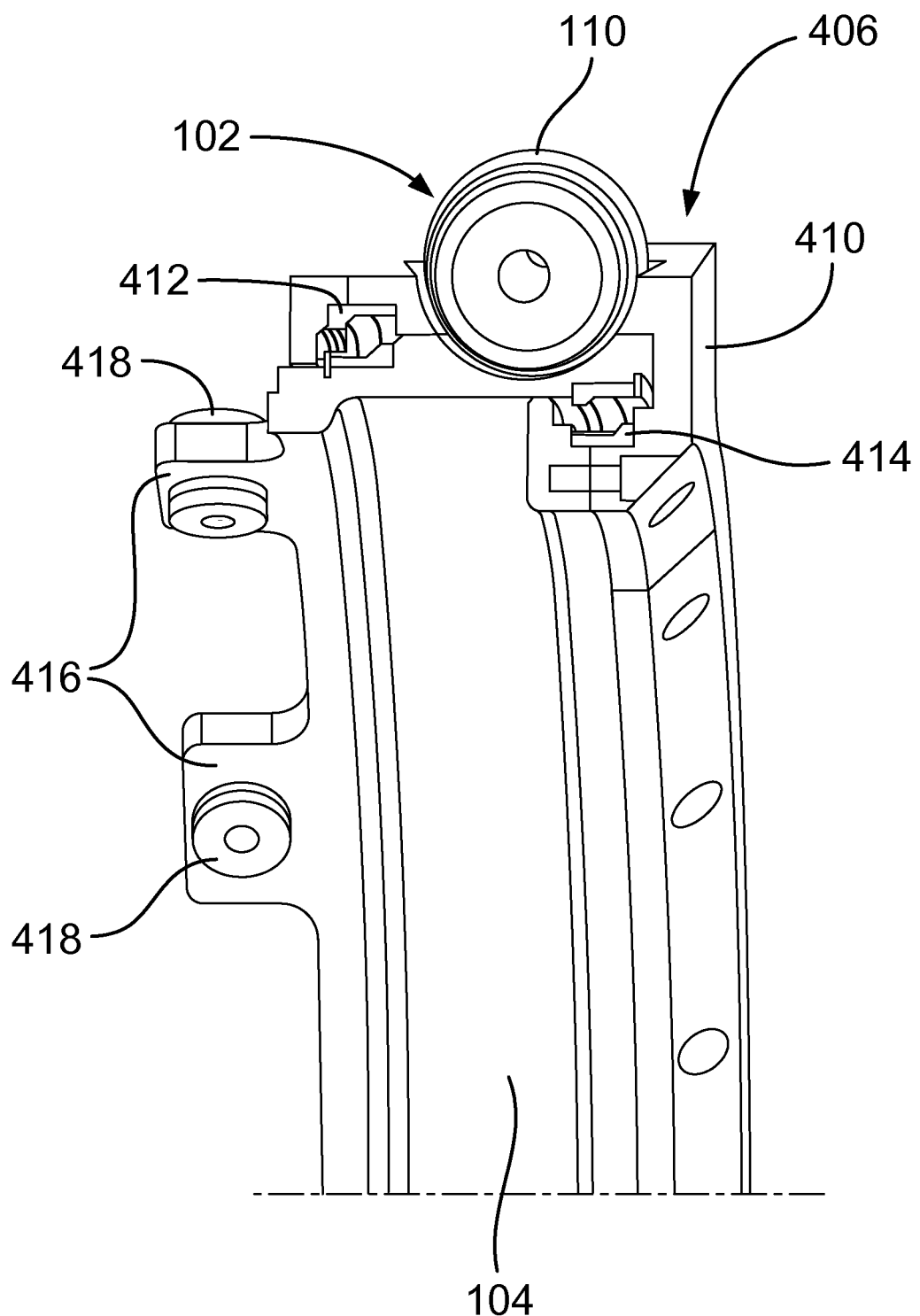
FIG. 5 is a side section view of the taxiing assembly of FIG. 2.

Referring to FIGS. 4 and 5, the taxiing assembly 406 comprises the ball-worm assembly 100 within a housing 410 which supports bearings (not shown) for rotation of the driving shaft 102, a first motor (not shown) connected to a first end of the driving shaft 102 and a second motor (not shown) connected to a second end of the driving shaft 102.

The housing 410 also holds a roller bearing 412 and an angle contact bearing 414 supporting the driven shaft 104 for rotation within the housing 410.

The second shaft 104 is generally ring-shaped and comprises a plurality of circumferentially spaced projections 416 extending axially therefrom. Each projection 416 is in the shape of a rectangular tab and comprises an aperture through which an elastomeric mounting block 418 is attached. Each elastomeric mounting block 418 extends radially outward from the driven axis 105.

Figure 3:
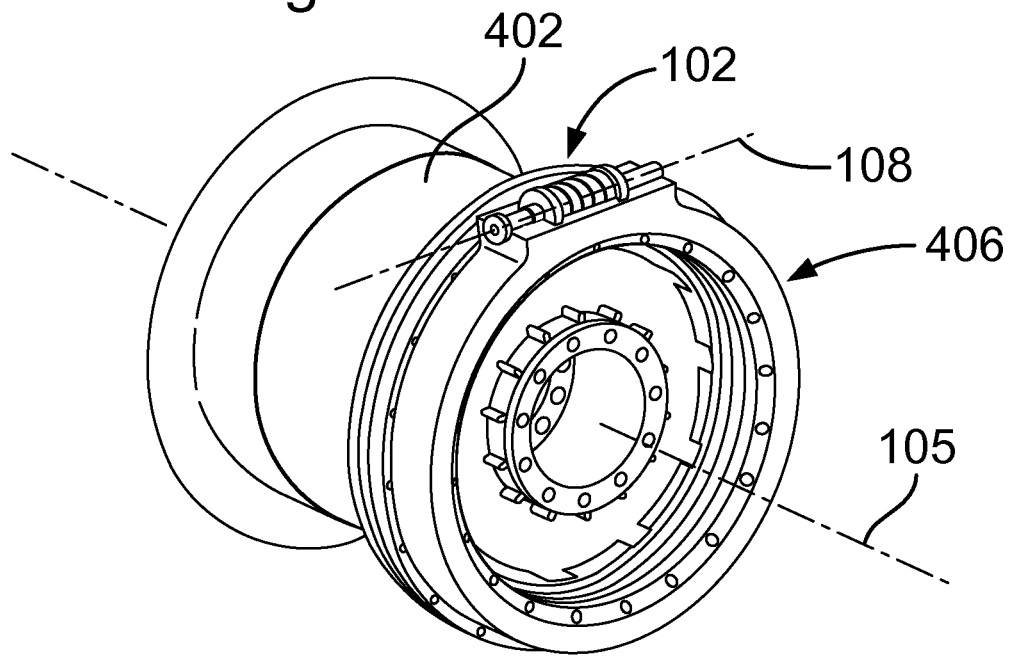
FIG. 3 is a perspective view of the wheel and taxiing assembly of FIG. 2.

As shown in FIG. 3, the taxiing assembly 406 is mounted to the wheel 402 via the elastomeric mounting blocks 418. The elastomeric mounting blocks 418 are attached to the wheel 402 to allow the transmission of torque but provide a flexible, resilient coupling between the driven shaft 104 and the wheel 402. This arrangement ensures that deformation within the wheel 402 (e.g. by the impact of landing the aircraft) is not transmitted to the driven shaft 104, and therefore does not affect the performance of the ball-worm drive 100.

Positioning of the driving shaft 102 at the top of the taxiing assembly (when installed) ensures that it is distant from the bottom of the wheel 402 which is likely to experience the most deformation during landing.

Advantageously, the driven shaft is of a radius R that is large enough to encircle the braking assembly 408, thus requiring no additional axial space.

Because ball-worm gears can be back-driven, the system will allow for the wheel 402 to be rotated by external forces, such as when the plane takes off or lands. As an alternative, a gear disengagement mechanism may be provided to disengage the gear, either between the drive source and the driving shaft 102, or between the driving shaft 102 and the driven shaft 104. A clutch may be used for this purpose.

It will be noted that a cover plate (not shown) covers the driving shaft 102 in use.

The invention claimed is:

1. An aircraft landing gear, comprising:
   a landing gear wheel mounted for rotation about a horizontal wheel axis relative to a landing gear housing;

a taxiing actuator comprising:
  an electric motor mounted to the landing gear housing;
  a first shaft driven by the electric motor, the first shaft defining a first axis tangential to the housing, and,
  a second shaft driving the landing gear wheel in rotation, the second shaft defining a second axis transverse to the first axis,
  in which the first shaft and second shaft are connected in driving engagement by a ball-worm gear, wherein the rotation of said first shaft is translated into the rotation of said second shaft by said ball-worm gear, and wherein said first shaft and said second shaft can be back driven by said ball-worm gear so that the second shaft drives the first shaft.

2. An aircraft landing gear system according to claim 1 in which the first axis and the second axis are substantially perpendicular.

3. An aircraft landing gear system according to claim 1 in which the second shaft comprises a radially resilient mounting arrangement for connection to the landing gear wheel.

4. An aircraft landing gear system according to claim 3 in which the mounting arrangement comprises a plurality of circumferentially spaced elastomeric elements.

5. An aircraft landing gear system according to claim 4 in which the elastomeric elements are mounted on projections extending axially from the second shaft.

6. An aircraft landing gear system according to claim 5, wherein the elastomeric elements extend radially outward from the axis of the second shaft.

7. An aircraft landing gear system according to 6, wherein the projections comprise a generally rectangular profile having an aperture therethrough, each elastomeric element attaching to a respective projection through an aperture.

8. An aircraft landing gear system according to claim 1 comprising a drive disengagement mechanism to disengage the motor and the landing gear wheel.

9. An aircraft landing gear system according to claim 8 in which the drive disengagement mechanism is connected to the first shaft to disengage the motor from the landing gear wheel.

10. An aircraft landing gear system according to claim 8 in which the drive disengagement mechanism is arranged to disengage the ball-worm drive.

11. An aircraft landing gear mechanism according to claim 8, wherein said disengagement mechanism is a clutch.

12. An aircraft landing gear system according to claim 1 in which the second shaft is coaxial with the landing gear wheel.

13. An aircraft landing gear system according to claim 1 comprising a brake subassembly arranged to brake the wheel, in which the second shaft substantially surrounds the brake subassembly.

14. An aircraft landing gear system according to claim 1 in which the ball-worm gear engages an outer surface of the second shaft.

15. An aircraft landing gear system according to claim 1 comprising a drive disengagement mechanism between the second shaft and the landing gear wheel.

* * * * *